Oct. 3, 1950     J. DAUGHERTY     2,524,043
MEANS OF CONTROLLING TEMPERATURE OF MACHINERY
Filed July 7, 1943     2 Sheets-Sheet 2

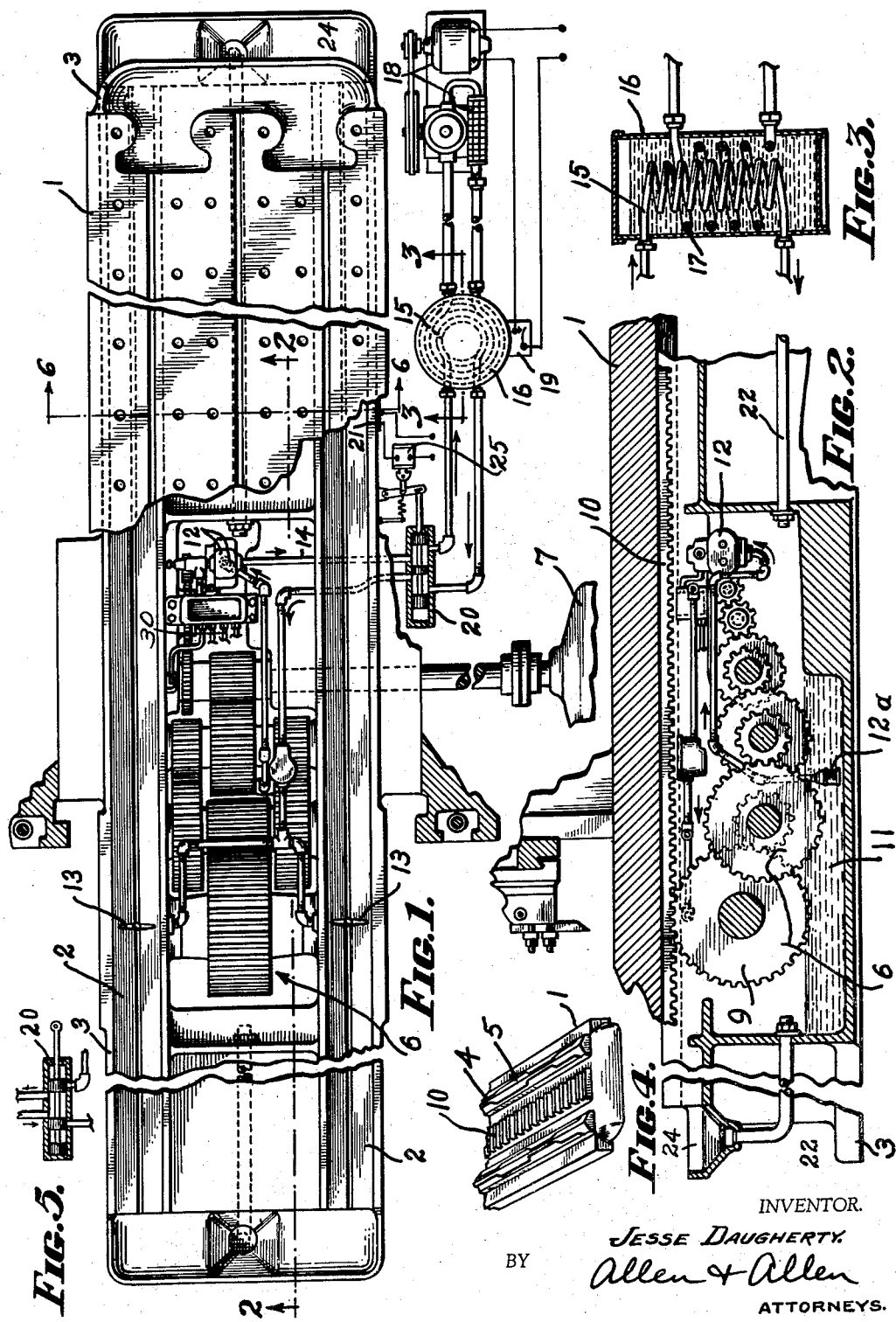

JESSE DAUGHERTY.
INVENTOR.

BY Allen & Allen
Attorneys

Patented Oct. 3, 1950

2,524,043

UNITED STATES PATENT OFFICE 2,524,043

MEANS OF CONTROLLING TEMPERATURE OF MACHINERY

Jesse Daugherty, Cincinnati, Ohio, assignor to The Cincinnati Planer Company, Cincinnati, Ohio, a corporation of Ohio Application July 7, 1943, Serial No. 493,749

4 Claims. (Cl. 184—6)

1

My invention relates to means for controlling the temperature of machinery and particularly the ways in a planer or the like.

The table of a planer reciprocates back and forth in ways which are usually lubricated by flowing oil. However, due to the weight of the table and work piece a considerable amount of heat is developed by the friction of the ways.

The table of a modern planer consists of two plates tied together by suitable ribbing. The bottom plate carries the ways usually in the form of two parallel V's. The top plate is accurately finished with suitable T slots and stop holes for clamping the work piece. When the ways heat up, the table has the action of a bimetal strip in that as the ways and bottom plate expand and the top plate remains cooler, the table curls up, unseating the ends of the table ways from their bearing on the bed ways.

This causes inaccurate planing and allows the table to slide over particles of dirt and metal which causes scoring of the ways.

It is an object of my invention to provide a means of preventing the planer table from becoming sufficiently hot to result in the above mentioned characteristics and to control the temperature of the planer table within certain limits, and thus insure greater accuracy of the work done on the planer.

It is a further object of my invention to provide a device which accomplishes the above and which is simple to install in the usual type of planer but which is extremely efficient in its operation.

These and other objects of my invention which will be set forth hereinafter or will be apparent to one skilled in the art upon reading these specifications, I accomplish by that certain construction and arrangement of parts of which I shall now describe an exemplary embodiment. Reference is now made to the drawing which forms a part thereof and in which:

Figure 1 is a plan view of a typical planer with a portion of the table cut away to show the installation of my device.

Figure 2 is a cross-section of Figure 1 taken on the section line 2—2 thereof.

Figure 3 is a cross-section of the brine tank taken on the section line 3—3 of Figure 1.

Figure 4 is a perspective bottom view of the planer table.

Figure 5 is a cross-section of the thermostatically controlled valve shown in its opposite position from that shown in Figure 1.

2

Figure 6:
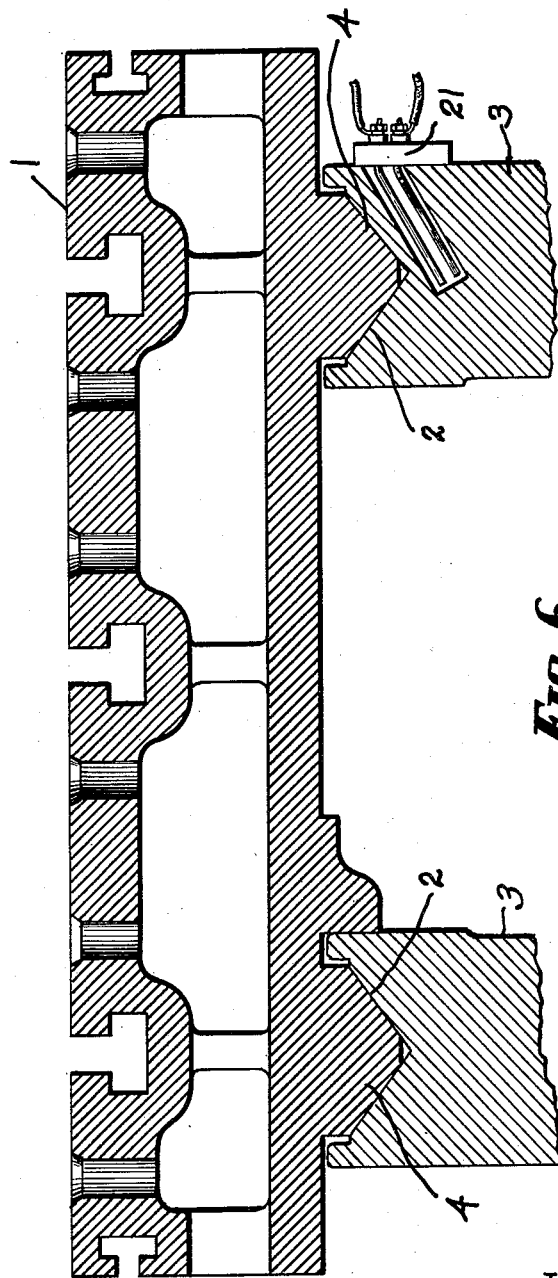
Figure 6 is a cross-section taken on the section line 6—6 of Figure 1.

Briefly, in the practice of my invention I control the temperature of the machine by controlling the temperature of the oil which circulates through grooves in the ways. I control the temperature of the oil by artificially cooling a portion of the oil passageway prior to its entry in the machine. Thermostatically controlled arrangements are made to shunt out the cooled portion of the passageway when the temperature of the ways is such as not to require cooling.

Referring to the drawings, Figure 1 shows a planer table 1, resting in ways 2 of the bed 3. The ways 2 have a V-shaped cross-section and on the bottom of the table 1 are V cross-sectioned ways 4, which fit within the ways 2.

The ways 4 (Figure 4) are grooved as at 5 to permit easy flow of the oil to lubricate the same and to insure even distribution of the oil over the contacting surfaces of the ways.

The table 1 is reciprocated back and forth over the bed 3 by means of the gearing generally shown at 6. The gear train is driven by motor 7, which results in the gear 9 turning clockwise for a predetermined distance and then counter clockwise for a predetermined distance. The gear 9 meshes with the rack 10 on the bottom of the table 1.

In the bed or support 3 is provided an oil sump 11, in which gears 6 lie. Normally an oil pump 12 is provided, which picks up oil from the sump 11 through its inlet 12ª and discharges it through various passageways 30 to the bearings of the shafts of the gears 6 as is customary in the trade and the oil outlets 13 in the ways.

I have provided a second and distinct outlet 14 from the pump 12 which is connected to a coil 15 in a tank 16 containing brine or other non-freezing solution. The outlet from the coil 15 is connected to the oil outlets 13 in the ways.

Within the tank 16 I also provide a refrigerator evaporator coil 17, which is connected up to a condenser and compressor, shown at 18, and which is of the usual type. I provide a thermostatic switch 19, associated with the tank 16 for maintaining a given predetermined temperature within the tank 16.

From the above it is apparent that when the planer is started, after sitting a length of time, the table and bed ways are approximately at room temperature, and the pump 12 draws oil from the sump 11, pumping a portion to the shaft bearings of the gear train 6, and another portion of this oil is discharged from the pump 12 through the outlet 14, through the valve 20, and hence through the outlets 13 onto the grooves 5 in the table ways to lubricate the same.

I preferably provide a thermostatically controlled valve 20. The connection between the outlet 14 of the pump and the coil 15, as well as the connection from the outlet of the coil 15 to the oil outlet 13 in the ways, passes through this valve. The valve core is controlled by a solenoid 25, which, in turn, is energized by a thermostat, generally shown at 21. When the valve is in the position shown in Figure 1 of the drawings, the oil is permitted to flow through the tank 16, and hence be cooled before flowing to the ways. The theremostat 21 is preferably set in a hole in the support 3 close to and responsive to the temperature changes of the ways 2, so that it is actuated by the temperature change in the ways themselves. When the temperature of the ways reaches a certain predetermined minimum, the thermostat energizes the solenoid 25, and the core of the valve 20 is thrown into the position shown in Figure 5. In this position all connections with the coil 15 and the tank 16 are cut off, and the outlet 14 of the pump 12 is directly connected to the passageway, carrying the oil directly to the oil outlet 13 in the ways. Thus, when the valve 20 is in the position shown in Figure 5, the oil flowing to the ways is not refrigerated.

After running awhile, the friction of the table on the bed ways causes the ways to warm up, which, in turn, actuates the thermostat 21, causing the solenoid 25 to shift the valve 20 to the position shown in Figure 1. This directs the portion of the oil discharging through the outlet 14 to flow through the pipe, and hence through the coil 15 where its temperature is lowered and thence out through the oil outlet 13 onto the ways. Inasmuch as the oil flowing to the ways is cooled, the ways themselves are appreciably cooled.

While I have shown a solenoid directly actuated by the bimetallic thermostat, it is probably preferable to handle the solenoid current by means of a mercury type switch or to place the bimetallic thermostat in a pilot circuit, and hence I do not intend to limit myself to the manner in which the theremostat actuates the valve 20.

During the operation of the planer, the oil flows from the ways 2 into the pans 24 at each end of the base and thence through the passageways 22 back into the oil sump 11.

From the above it will be noted that the oil in the oil sump 11 is not refrigerated with the possibility of making it viscous and difficult to flow. It is also to be noted that the oil flowing to the bearings of the gears is not refrigerated, and the only oil which is refrigerated is that which flows to the ways of the planer.

I, of course, do not intend to limit myself to the type of refrigerating device shown, since numerous other refrigerating devices will serve equally as well. My means may, of course, be used with other kinds of machinery than a planer, and the particular advantage is that the only oil that is refrigerated is that which flows to the portion of the machinery which it is desired to cool.

It is to be understood that modification may be made in my invention without departing from the spirit thereof and that I do not intend to limit myself other than is pointed out in the claims which follow.

I claim:

1. In a planer or the like having gearing and ways together with lubricating means including a single oil pump and means defining separate oil passageways to the gearing and ways, a temperature control mechanism for the ways alone comprising, in combination, a refrigerator including an evaporator, a portion of the means defining a separate passageway to the ways positioned in heat exchange contact with said evaporator, by-pass means for by-passing lubricating oil around said portion of the passageway defining means, and a thermostat adjacent the ways and responsive of the temperature thereof for actuating said by-pass means so that the temperature of the oil fed to said ways varies in response to changes in temperature of the latter.

2. In a planer or the like having gearing with bearings therefor and a reciprocable table slidable on ways having oil outlets for lubrication of the ways by flowing oil pumped from a sump, a temperature control mechanism for the ways comprising, in combination, an oil pump having an inlet in the oil sump and having first and second outlets for circulating oil from said sump, said first outlet being in communication with the gearing bearings, a brine tank having a coil therein defining an oil passageway, one end of the passageway defined by said coil being in communication with the second outlet of said pump and the other end thereof being in communication with the oil outlets in the ways so that oil passing from the pump to the ways is artificially cooled, a single by-pass valve, and a thermostat positioned adjacent the ways and responsive to the temperature thereof, said valve being interposed between the second outlet of said pump and the passageway defined by said coil and also between the latter and the oil outlet in the ways so that said valve in one operative position is adapted to permit oil to flow through the passageway defined by said coil and in a second operative position cuts off the passageway defined by said coil and joins the pump outlet to the outlets in the ways permitting oil to flow directly from the pump to the ways.

3. In a planer or the like having gearing and ways and means for lubricating the same including a single oil pump and means defining separate oil feed passageways from the pump to the gearing and the ways, a temperature control mechanism for the ways alone comprising, in combination, a tank containing a non-freezing medium, a refrigerator having an evaporator positioned in said tank for cooling said medium, a portion of the means defining a separate oil feed passageway from the pump to the ways being positioned to be surrounded by said medium, a thermostat adjacent the ways and responsive to the temperature thereof, and a by-pass valve adapted to be actuated by said thermostat and to by-pass oil around the said portion of the passageway defining means when the temperature of the ways has reached a predetermined low.

4. In a planer or the like having ways, means defining two oil passageways, one leading to one portion of the machine and the other to the ways for lubricating the same, means for forcing oil through said passageways, means for controlling the temperature of the ways alone comprising, in combination, a tank containing a non-freezing medium, the evaporator of a refrigerator positioned in said tank for cooling said medium, a portion of the oil feed passageway defining means leading to the ways being positioned to be surrounded by said medium, a thermostat adjacent the ways and responsive to the temperature thereof, and valve means adapted for actuation by said thermostat for by-passing oil around the said portion of the passageway defining means leading to the ways when the temperature of the ways has reached a predetermined low.

JESSE DAUGHERTY.

REFERENCES CITED

The following references are of record in the file of this patent:

UNITED STATES PATENTS

| Number | Name | Date |
| --- | --- | --- |
| 1,334,844 | Day | Mar. 23, 1920 |
| 1,421,805 | Melown | July 4, 1922 |
| 1,476,949 | Cardullo | Dec. 11, 1923 |
| 1,902,970 | Ramsaur et al. | Mar. 28, 1933 |
| 2,024,536 | Pearce | Dec. 17, 1935 |

FOREIGN PATENTS

| Number | Country | Date |
| --- | --- | --- |
| 504,736 | Great Britain | May 1, 1939 |